US009639253B2

(12) United States Patent
Reponen (10) Patent No.: US 9,639,253 B2
(45) Date of Patent: May 2, 2017

(54) SUPPORTING A PRESENTATION OF INFORMATION TO A USER

(75) Inventor: Erika Reponen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 347 days.

(21) Appl. No.: 14/362,682

(22) PCT Filed: Dec. 8, 2011

(86) PCT No.: PCT/IB2011/055543
§ 371 (c)(1),
(2), (4) Date: Aug. 20, 2014

(87) PCT Pub. No.: WO2013/084028
PCT Pub. Date: Jun. 13, 2013

(65) Prior Publication Data
US 2014/0372884 A1    Dec. 18, 2014

(51) Int. Cl.
G06F 15/00 (2006.01)
G06F 13/00 (2006.01)
G06F 3/0484 (2013.01)
G06F 17/30 (2006.01)
G09B 29/00 (2006.01)
G06F 3/0482 (2013.01)

(52) U.S. Cl.
CPC ........ *G06F 3/04842* (2013.01); *G06F 3/0482* (2013.01); *G06F 17/30905* (2013.01); *G09B 29/007* (2013.01)

(58) Field of Classification Search
CPC .............. G06F 3/04817; G06F 17/30398
USPC ................. 715/734, 700, 763–765
See application file for complete search history.

(56) References Cited

U.S. PATENT DOCUMENTS

2009/0172511 A1   7/2009 Decherd et al.
2010/0088619 A1*  4/2010 Rath .................. G06F 8/38
                                                  715/764
(Continued)

OTHER PUBLICATIONS

International Search Report received for corresponding Patent Cooperation Treaty Application No. PCT/IB2011/055543, dated Oct. 11, 2012, 5 pages.

(Continued)

*Primary Examiner* — Kevin Nguyen
(74) *Attorney, Agent, or Firm* — Alston & Bird LLP (57) ABSTRACT

An apparatus presents a plurality of information items to a user. Each information item corresponds to at least on piece of information that is marked by at least one tag in a single source script. The apparatus enables a user to select presented information items. The apparatus further enables a use of a plurality of pieces of information from the source script marked by tags, which correspond to information items selected by a user, for presentation in a single graphical representation to the user. Another apparatus automatically obtains a plurality of pieces of information marked by a plurality of tags included in a single source script that is available at a further apparatus, and presents the plurality of pieces of information in a single graphical representation to a user. The information may represent a plurality of locations, times or an area. The graphical representation may comprise a map or a timeline. The source script may be that of a Web page. A user may be enabled to perform a location based search or a time based search.

18 Claims, 5 Drawing Sheets

(56) References Cited

U.S. PATENT DOCUMENTS

2011/0173193 A1* 7/2011 Ahn .................. G06F 17/30398
707/725
2011/0214050 A1* 9/2011 Stambaugh ......... G06F 3/04817
715/234

OTHER PUBLICATIONS

"Los Angeles—Wikipedia." [retrieved Nov. 11, 2016]. Retrieved from the Internet: <URL: https://en.wikipedia.org/wiki/Los_Angeles>. (dated Nov. 8, 2016) 30 pages.
"Olympic Games—Wikipedia." [retrieved Nov. 11, 2016]. Retrieved from the Internet: <URL: https//en.wikipedia.org/wiki/Olympic_Games>. (dated Oct. 14, 206) 31 pages.
"Nokia 3D World Gaze—Nokia Beta Labs." [retrieved Nov. 15, 2016]. Retrieved via the Internet Archive Wayback Machine at <http://web.archive.org/web/20111205144850/http://betalabs.nokia.com/apps/nokia-3d-world-gaze>. (dated Nov. 7, 2011) 2 pages.
"Flickr: Explore everyone's photos on a Map." [retrieved Nov. 11, 2016]. Retrieved from the Internet: <URL: https://www.flickr.com/map/>. (dated Nov. 11, 2016) 2 pages.
Written Opinion of the International Searching Authority for corresponding Patent Cooperation Treaty Application No. PCT/IB2011/055543, dated Oct. 11, 2012, 9 pages.

* cited by examiner

Olympics - info page show map

This is example text

Olympic Games it the wonderful event of joy and fun, arranged every second year. Winter and Summer Olympics are in different years. And so on ...

Coordinates & time tags - where & when 15.03.2054
11'02 - 37'45

SUPPORTING A PRESENTATION OF INFORMATION TO A USER

RELATED APPLICATION

This application was originally filed as PCT Application No. PCT/IB2011/055543 filed on Dec. 8, 2011.

FIELD OF THE DISCLOSURE

The invention relates to the field of presenting information to a user.

BACKGROUND

Some Web pages dealing with a particular topic may present coordinates for a location that is related to the topic and enable a selection of these coordinates for obtaining an indication of the location on a map.

For instance, when calling up the Wikipedia page for "Los Angeles", the coordinates "34°03N 118°15W" are presented on the right hand side at the top. By clicking these coordinates or an icon next to it, the location of Los Angeles is presented on a map.

SUMMARY OF SOME EMBODIMENTS OF THE INVENTION

A method is described, which comprises at an apparatus presenting a plurality of information items to a user, each information item corresponding to at least one piece of information that is marked by at least one tag in a single source script. The method further comprises enabling a user to select presented information items. The method further comprises enabling a use of a plurality of pieces of information from the source script marked by tags, which correspond to information items selected by a user, for presentation in a single graphical representation to the user.

Moreover a first apparatus is described, which comprises means for realizing the actions of the presented method.

The means of this apparatus can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chipset or a chip, like an integrated circuit.

Moreover a second apparatus is described, which comprises at least one processor and at least one memory including a source script, the at least one memory and the source script configured to, with the at least one processor, cause an apparatus at least to perform the actions of the presented method.

Moreover a non-transitory computer readable storage medium is described, in which a source script is stored. The source script causes an apparatus to perform the actions of the presented method when processed by a processor.

The computer readable storage medium could be for example a disk or a memory or the like. The source script could be stored in the computer readable storage medium in the form of instructions encoding the computer-readable storage medium. The computer readable storage medium may be intended for taking part in the operation of a device, like an internal or external hard disk of a computer, or be intended for distribution of the source script, like an optical disc.

It is to be understood that also the source script by itself has to be considered an embodiment of the invention.

In one embodiment, the described methods are information providing methods, and the described first apparatus is an information providing apparatus. In one embodiment, the means of the described first apparatus are processing means.

In certain embodiments of the described methods, the methods are methods for supporting a presentation of information to a user. In certain embodiments of the described apparatuses, the apparatuses are apparatuses for supporting a presentation of information to a user.

Moreover a system is described, which comprises one of the presented apparatuses and in addition a further apparatus configured to provide source scripts and/or a further apparatus configured to support graphical representations of information.

For a second aspect of the invention, a method is described, which comprises automatically obtaining a plurality of pieces of information marked by a plurality of tags included in a single source script that is available at another apparatus. This method further comprises presenting the plurality of pieces of information in a single graphical representation to a user. For the second aspect of the invention, an apparatus may comprise means for realizing these actions. An apparatus could comprise for instance at least one processor and at least one memory including a source script, the at least one memory and the source script configured to, with the at least one processor, cause an apparatus at least to perform the actions of the method presented for the second aspect of the invention. For the second aspect, a non-transitory computer readable storage medium may store a source script, which causes an apparatus to perform the actions of the method presented for the second aspect of the invention when executed by a processor.

It is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
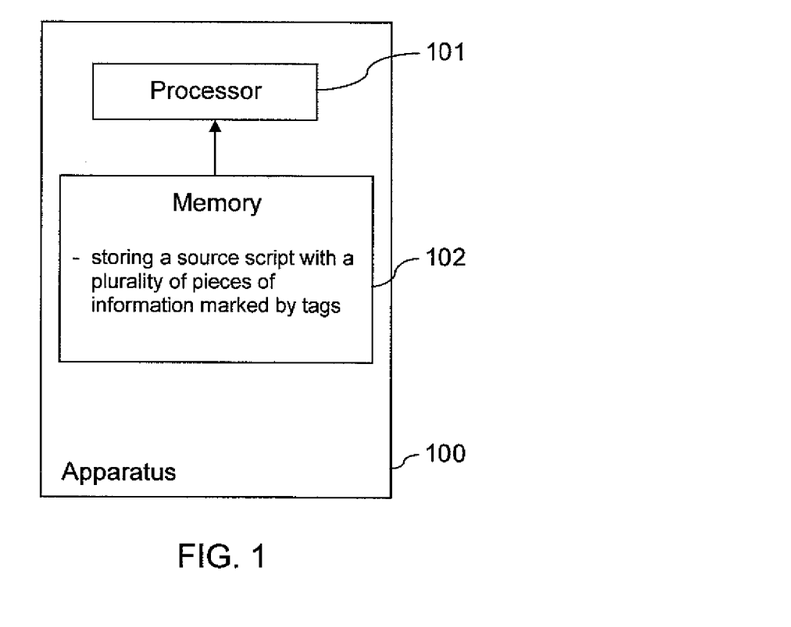
FIG. 1 is a schematic block diagram of an apparatus.

FIG. 1 is a schematic block diagram of an apparatus 100. Apparatus 100 comprises a processor 101 and, linked to processor 101, a memory 102. Memory 102 stores a source script, or source code, with a plurality of pieces of information marked by tags. Processor 101 is configured to process the script stored in memory 102 in order to cause an apparatus to perform desired actions.

Apparatus 100 could be a mobile terminal or any other kind of device enabling a presentation of information to a user. Apparatus 100 could equally be a module for a mobile terminal or for any other device, like a chip, circuitry on a chip or a plug-in board. Apparatus 100 is an exemplary embodiment of an apparatus according to the invention. Apparatus 100 could comprise only the indicated components or one or more additional components, like a data interface, a user interface, a further memory, a further processor, etc.

An operation of apparatus 100 will now be described with reference to the flow chart of FIG. 2. The operation is an exemplary embodiment of a method according to the invention. Processor 101 and the source script stored in memory 102 cause an apparatus to perform the operation when the source script is retrieved from memory 102 and processed by processor 101. The apparatus that is caused to perform the operation can be apparatus 100 or some other apparatus, in particular a device comprising apparatus 100. It is to be understood that in exemplary embodiments, processor 101 may execute additional program code for processing the source script. Such program code may but does not have to be stored in the same memory 102.

The apparatus presents a plurality of information items to a user, each information item corresponding to at least one piece of information that is marked by at least one tag in a single source script. (action 111)

The apparatus furthermore enables a user to select presented information items. (action 112)

The apparatus furthermore enables a use of a plurality of pieces of information from the source script marked by tags, which correspond to information items selected by a user, for presentation in a single graphical representation to the user. (action 113)

Certain embodiments of the invention may thus enable an apparatus to support a graphical representation of pieces of information marked by a plurality of tags, when corresponding presented information items have been selected by a user. It is to be understood that the presented information items and the pieces of information marked by tags can but do not have to be identical to each other.

Certain embodiments of the invention may thus have the effect that presenting a plurality of pieces of information in a single graphical representation is facilitated.

Figure 2:
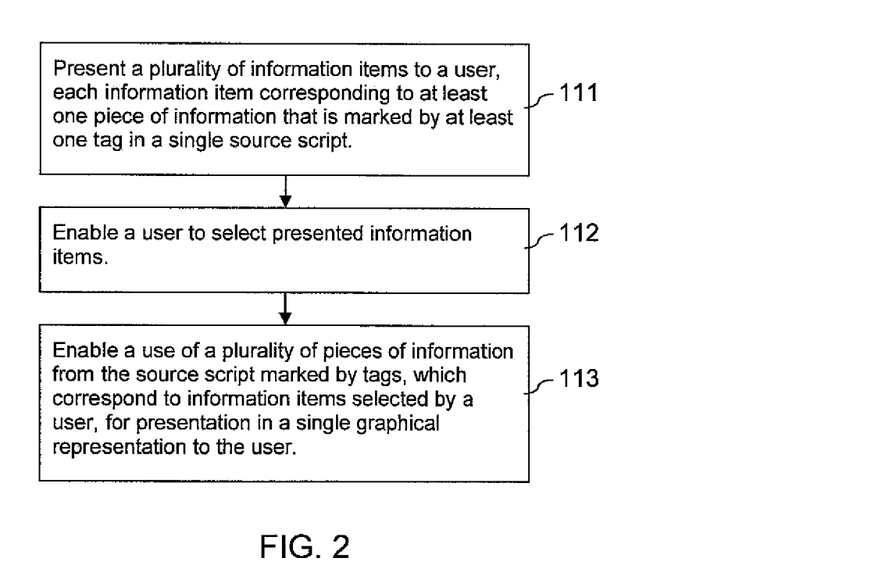
FIG. 2 is a flow chart illustrating a method.

Apparatus 100 illustrated in FIG. 1 and the operation illustrated in FIG. 2 may be implemented and refined in various ways.

In an exemplary embodiment of the invention, enabling a user to select presented information items comprises enabling a user to select an arbitrary number of presented information items.

This may have the effect that a user may flexibly select which ones of presented information items are currently of interest for a graphical representation. In case there is a large number of information items, a simultaneous graphical representation of information corresponding to all information items might be somewhat confusing.

It is to be understood, however, that certain embodiments might also support only a selection of all presented information items as a whole for obtaining a graphical representation.

In an exemplary embodiment of the invention, the plurality of pieces of information comprise at least one of a plurality of locations, a plurality of times, and an area.

The locations could be for instance different locations where a repeating event occurred and the times could be for instance different dates at which the repeating event occurred. A combination of a particular location and of a particular time could also be marked by a single tag. Alternatively, a location and a time individually marked by tags could be associated to each other by appropriate means, for instance by means of at least one further tag. A combination of different locations marked by tags could moreover define an area, and such different locations could equally be associated to each other by appropriate means, for instance by means of at least one further tag. In case several pieces of information are associated to each other in the source script, the information item that is selectable by a user could correspond to a respective set of associated pieces of information, for instance to location and time.

In an exemplary embodiment of the invention, the graphical representation comprises a map and/or a time line.

A plurality of locations marked by location tags could be presented for instance on a map. This may have the effect that events at different locations relating to a topic of the source script could be shown at all related locations on the map. A plurality of instants of time marked by time tags could be presented for instance on a time line. This may have the effect that events at different times relating to a topic of the source script could be shown with a well-arranged distribution. A map and a time line could also be combined in a single graphical representation.

Conventionally, in contrast, Web pages enable a user at the most to select a single set of coordinates for presentation in a map. They enable a user neither to select a plurality of sets of coordinates for presentation in a map nor to select any points of time for presentation on a time line.

It is to be understood that any other graphical representation suitable for the included kind of tags could be used as well with any desired user interface.

In an exemplary embodiment of the invention, the source script is a source script for a Web page. Such a Web page could be for instance a Wikipedia page or any other informative page on a particular topic.

It is to be understood that alternatively, the source script could equally be a source script for any other application, or for a single item, a single thing, a single event, etc.

The graphical representation could be provided by the same Web page or application, for example by the same source script. Alternatively, it could be provided by some other Web page or application making use of the pieces of information marked by tags in the source script. For example, "Nokia 3D World Gaze" could obtain location coordinates marked by a plurality of tags in the source script of a Wikipedia page and then show several locations corresponding to the obtained coordinates on a map. Thus, a second Web page or application may use information from a first Web page or application to show items on map more freely and comprehensively and pervasively.

In an exemplary embodiment of the invention, a user is further enabled to perform at least one of a location based search and a time based search by interacting with the graphical representation. For instance, a user could select a limited area of a presented map. As a result, only the locations in the limited area, which correspond to pieces of information marked by tags in the source script, are shown on a larger scale. In a mixed presentation of a map and a time line, a user could select a limited period of time on a time line, and as a result only the location of the events that occurred during this period of time could be indicated on the map.

Figure 3:
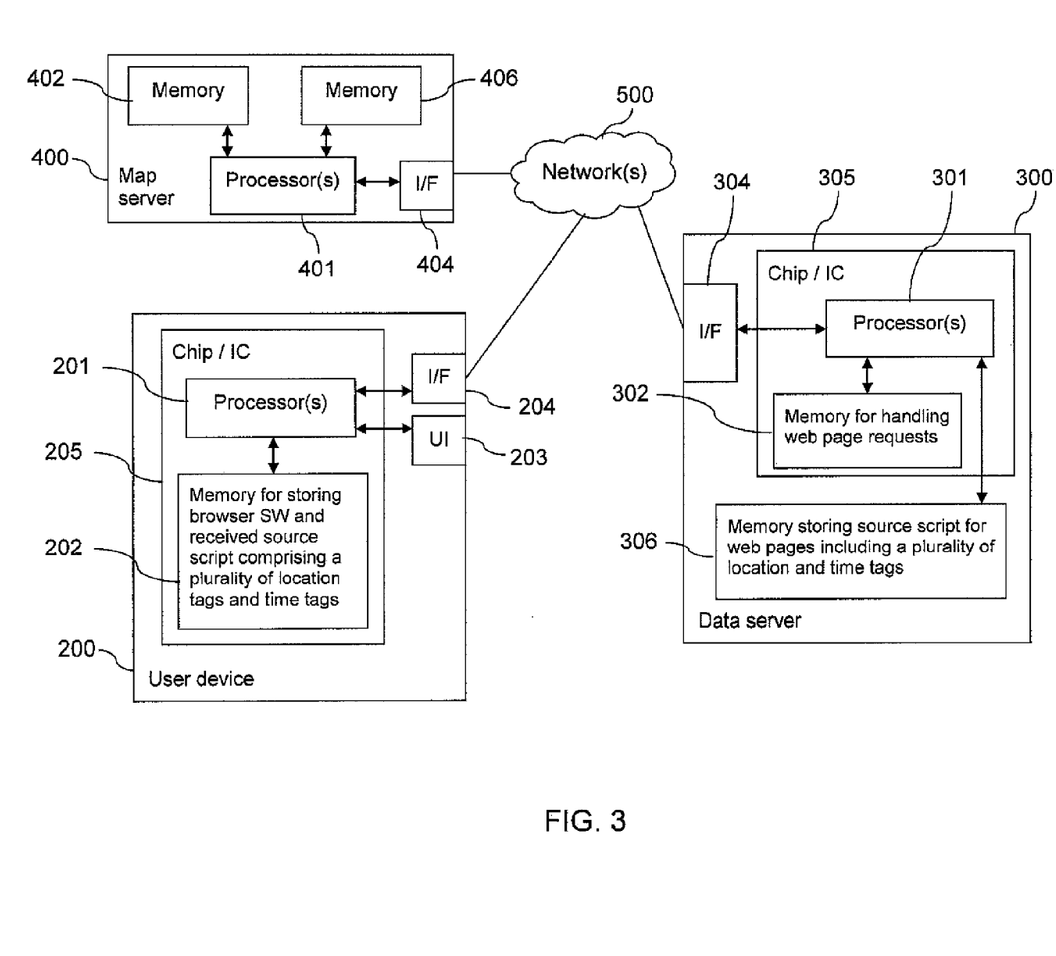
FIG. 3 is a schematic block diagram of a system.

FIG. 3 is a schematic block diagram of a system according to the invention.

The system comprises a user device 200, a data server 300 as a first Web server, a map server 400 as a second Web server, and at least one network 500. The at least one network 500 is suited to interconnect user device 200 with server 300 and server 400. Server 300 and/or server 400 could also belong to the at least one network 500. The at least one network 500 could comprise for instance the Internet. In addition, the at least one network 500 could comprise for instance a cellular network or a wireless local area network providing access to the Internet for mobile user devices.

User device 200 could be any kind of user device, including a mobile device, like a mobile phone, a smart phone, a laptop, a tablet computer, etc., and a stationary device, like a personal computer (PC).

User device 200 comprises at least one processor 201 that is linked to at least one memory 202, to at least one user interface 203 and to at least one communication interface (I/F) 204. Processor 201 is configured to execute computer program code, including computer program code stored in memory 202, in order to cause user device 200 to perform desired actions.

Memory 202 is suited to store the source script for Web pages. Memory 202 stores in addition a browser software enabling processor 201 to process source scripts for Web pages. In addition, memory 202 may store computer program code implemented to realize other functions, as well as any kind of other data.

Processor 201 and memory 202 may optionally belong to a chip or an integrated circuit 205, which may comprise in addition various other components, for instance a further processor or memory.

User interface 203 comprises at least a display and some input means, for instance in the form of a microphone, a touchscreen and/or a keypad.

Interface 204 is a component which enables user device 200 to communicate with other devices via the at least one network 500, for instance with other user devices or with various servers, like server 300 or server 400. Interface 204 could comprise for instance a TCP/IP socket, a cellular transceiver or a wireless local area network (WLAN) transceiver.

Component 205 or user device 200 could correspond to exemplary embodiments of an apparatus according to the invention.

Server 300 comprises a processor 301 that is linked to a first memory 302, to a second memory 306 and to an interface (I/F) 304. Processor 301 is configured to execute computer program code, including computer program code stored in memory 302, in order to cause server 300 to perform desired actions. Memory 302 stores computer program code for handling Web page requests. In addition, memory 302 may store computer program code implemented to realize other functions, as well as any kind of other data.

Processor 301 and memory 302 may optionally belong to a chip or an integrated circuit 305, which may comprise in addition various other components, for instance a further processor or memory.

Memory 306 stores at least one database that can be accessed by processor 301. The database is configured to store source script for Web pages. It is further to be understood that alternatively, the database could store data that enables processor 301 to generate source scripts. It is further to be understood that the memory storing the database could also be external to server 300; it could be for instance on another physical or virtual server.

Interface 304 is a component which enables server 300 to communicate with other devices, like user device 200, via the at least one network 500. Interface 304 could comprise for instance a TCP/IP socket.

Server 400 is configured to provide a map service. It comprises a processor 401 that is linked to a first memory 402, to a second memory 406 and to an interface 404.

Processor 401 may be configured to execute computer program code, including computer program code stored in memory 402, in order to cause server 400 to perform desired actions, in particular to provide data for a graphical representation of locations and/or times. Memory 406 may store map data and other data for graphical representations.

An exemplary operation in the system of FIG. 3 will now be described with reference to the flow chart of FIG. 4. Operations at user device 200 are presented in the middle of FIG. 4, operations at data server 300 are presented on the left hand side of FIG. 4 and operations at map server 400 are presented on the right hand side of FIG. 4. Processor 201 with program code and source scripts stored in memory 202 cause user device to perform the presented operations when the program code is retrieved from memory 202 and executed by processor 201. Processor 301 and the program code stored in memory 302 cause server 300 to perform the presented operations when the program code is retrieved from memory 302 and executed by processor 301. Processor 401 and the program code stored in memory 402 cause server 400 to perform the presented operations when the program code is retrieved from memory 402 and executed by processor 401.

A user of user device 200 may request a Web page on a particular topic via user interface 203. (action 211) The Web page could be for instance a page providing overview information on the Olympic Games. The request is transmitted to data server 300 via network(s) 500.

Data server 300 receives the request, retrieves the source script for the Web page from memory 206 or dynamically generates the source script for the Web page by assembling data from one or more database(s). (action 311) The Web page may relate to an event that happened many times and in many locations, like the Olympic Games. The implementer of the Web page or an editor of the source script or an application supporting the generation of the source script has added all the locations and time information to the source script, and marked them by special tags. This may have the effect that these marked pieces of information are easily available to be used by others applications too, for instance by applications that are configured to show events or other information on a time line and or on a map, or any other possible applications. Respectively one location tag and one time tag may be associated to each other. Each pair of tags could mark pieces of information indicating for instance where and when a respective Olympic Game took place or will take place.

Data server 300 transmits the source script to user device 200.

User device 200 receives the source script and displays the corresponding Web page on the display. The pieces of information marked by the location and time tags are presented separately as a list of information items. (action 212)

Figure 5:
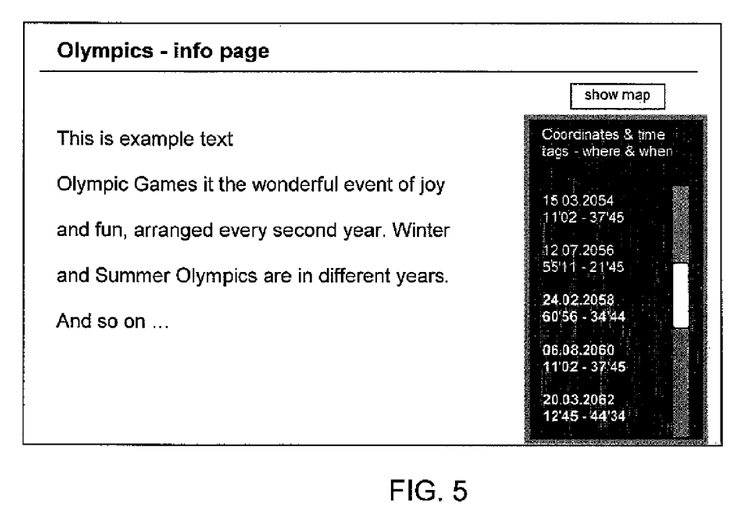
FIG. 5 is a diagram illustrating an exemplary Web page presenting information items corresponding to pieces of information marked by tags.

FIG. 5 is a diagram illustrating an exemplary presentation of an imaginary Web page.

The Web page comprises general information on the Olympic Games. The information may comprise text, tables, photos, graphics, etc. In addition the Web page comprises a separate area on the right hand side specifically for location and time information. In this area, the date—corresponding to a piece of information marked by one of the time tags in the source script—and the location in the form of coordinates—corresponding to a piece of information marked by one of the location tags in the source script—are presented for each game as a separate information item. The presented information is sorted by date. Since there have been many games, there is a scrollbar for scrolling from the information item for the first game to the information item for the last game.

Times and location coordinates in FIG. 5 are imaginary and written in a simplified way. In order to facilitate the understanding of the users, the coordinates could be presented on the Web page in a standard format using latitude and longitude values, such as 34°05'N 118°25'W. In the source script, the coordinates are preferably written in such a generic format as well as the pieces of information marked by tags, in order to enable other applications or pages to read and use the pieces of information without any additional knowledge of any special format. The time coordinates can be more or less exact, they could be presented for instance by the set {clock time/day/month/year} or any selection of such coordinates.

In addition, a button with the label "show map" is displayed.

A user may select one or more of the information items. For instance, a user could highlight three of the information items—as indicated by bold writing in FIG. 5—and then click the "show map" button. It is to be understood, though, that it is not required that the user may or has to highlight some of the information items before clicking the "show map" button.

User device 200 detects a user selection of information items. (action 213) It transmits a request to provide a map and a time line for the data to map server 400. User device 200 includes in the request the locations and times that correspond to the selected information items. Each location may be provided with a label to identify the location when presented on a map. The label could also be generated automatically from the topic of the Web page and the time associated to a location.

Map server 400 evaluates the received pieces of information and generates data for a map and for a time line suited for displaying the information belonging to the plurality of pieces of information in a map and on a time line. (action 411) The data for the map and for the time line could be for instance in the form of a source script for an additional Web page Map server 400 transmits the generated data to user device 200.

User device 200 displays the map and the time line as a graphical representation of the selected information. (action 214)

Figure 6:
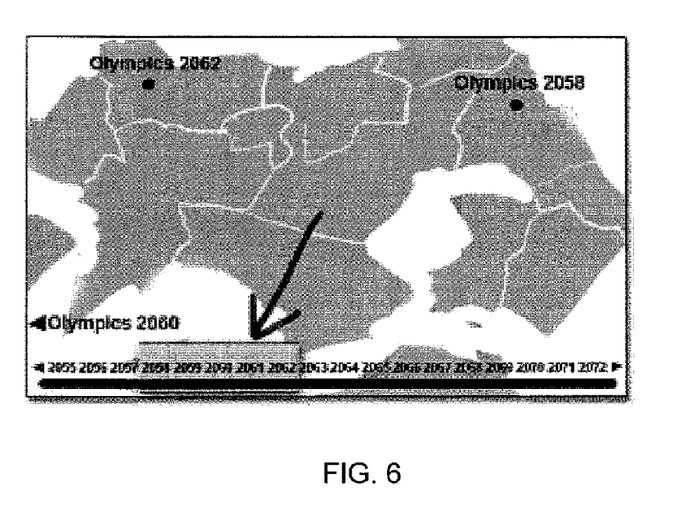
FIG. 6 is a diagram illustrating a graphical representation of a plurality of pieces of information in a single graphical representation.

FIG. 6 is a diagram illustrating an exemplary presentation of such a graphical representation.

The user has made a search, selection or filtering to show Olympic Games between the years 2058 to 2062 on a map, and the results are shown on the map at the correct locations. It should be noted that the map is imaginary as well.

Thus, multiple locations, such as all or selected Olympic Games locations, could be shown based on the information from a single Web page, like for example an Olympic Games Wikipedia page.

A time line at the bottom of the page indicates the currently selected time frame from year 2058 to year 2062. An arrow points to selected time frame.

The user could be enabled to change the time frame on the time line, to obtain a result for another time frame, for instance by increasing, reducing or shifting the indicated time frame. Then, all time tags in the source script are searched to find the marked times that fit into the time frame. These times and the associated locations may then be transmitted to server 400, which generates a new script for a new map and time line and sends this new script to user device 200. User device 200 may then present the updated map and time frame on its display. The Games could be also searchable based on a desired location. To this end, the user could select a certain location on the map, for instance by framing the location or by pointing to it. Then, all locations tags in the source script are searched to find the locations that fit into the area. These locations and the associated times may then be transmitted to server 400, which generates a new script for a new map and time line and sends this new script to user device 200. User device 200 may then present the updated map and time frame on its display. It would also be possible that a user sets both, a time frame using the time line and an area using the map.

In general, scale and size of the map as well as the time line may be user adjustable. In order to support such adjustments, user device 200 could transmit all tagged information from the source script in the first request to map server 400, or the tagged information may be transmitted as needed to map server 400 after each user input.

Summarized, certain embodiments of the invention may thus have the effect that by including various tags marking a plurality of pieces of information in a source script for a single Web page or for some other application, more comprehensive and more flexible graphical representations could be provided to a user.

Certain embodiments may enable an improved browsing of Web page or application content, such as a map with a time line, based on times and/or places to which it is related. The possibilities of presentation are furthermore more flexible. In particular, presentations can be more informative and comprehensive than when supporting only the presentation of a single location on a map.

Figure 7:
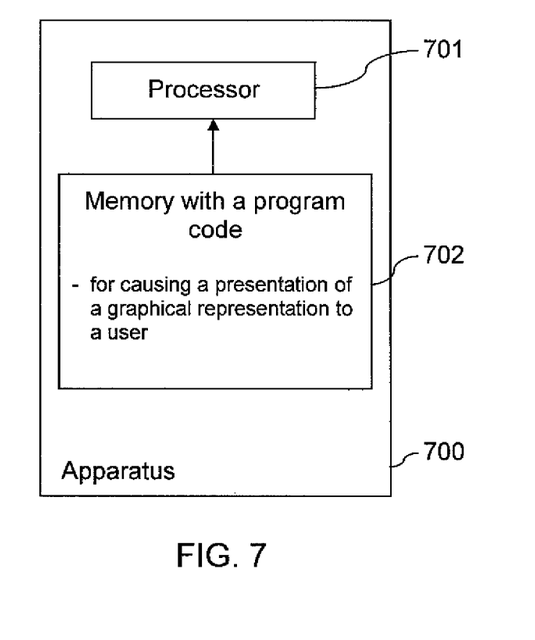
FIG. 7 is a schematic block diagram of a further apparatus.

FIG. 7 is a schematic block diagram of an apparatus 700. Apparatus 700 comprises a processor 701 and, linked to processor 701, a memory 702. Memory 702 stores computer program code for causing a presentation of a graphical representation of information to a user. Processor 701 is configured to execute program code stored in memory 702 in order to cause an apparatus to perform desired actions.

Apparatus 700 could be a navigation system apparatus or any other kind of device enabling a presentation of information to a user. Apparatus 700 could equally be a module for a device, like a chip, circuitry on a chip or a plug-in board. Apparatus 700 is an exemplary embodiment of an apparatus according to the second aspect of the invention. Apparatus 100 could comprise only the indicated components or one or more additional components, like a data interface, a user interface, a further memory, a further processor, etc.

An operation of apparatus 700 will now be described with reference to the flow chart of FIG. 8. The operation is an exemplary embodiment of a method according to the second aspect of the invention. Processor 701 and the program code stored in memory 702 cause an apparatus to perform the operation when the program code is retrieved from memory 702 and executed by processor 701. The apparatus that is caused to perform the operation can be apparatus 700 or some other apparatus, in particular a device comprising apparatus 700.

The apparatus automatically obtains a plurality of pieces of information marked by a plurality of tags included in a single source script that is available at another apparatus. (action 711) It is to be understood that the entire source script could be obtained from the other apparatus or that only the pieces of information could be obtained from the other apparatus. The data can be obtained automatically for instance by requesting the information from the other apparatus at regular intervals, by requesting the information each time when there is a defined change of location, by requesting the information each time when the apparatus is switched on, or by a push service of the other apparatus, etc.

The apparatus then presents the plurality of pieces of information in a single graphical representation to a user. (action 712)

This may have the effect that information from a single source script may be presented automatically to a user in a single graphical representation. This may be of advantage, for instance, for supplementing navigation maps used in a car with location specific information.

It is further to be understood that the approaches presented with reference to FIGS. 1 to 8 could be adapted to many different use cases.

For example, there are various other events than Olympic Games that may occur at many different times at many different occasions. A script for a page with generic information on such an event or on anything else that occurs or occurred various times and/or in various locations could be provided with multiple tags for marking location and/or time of each occurrence. Based on these tags, corresponding locations and times can be pointed out on a map or in another kind of graphical representation, either by the page itself or by any other kind of applications that automatically obtain data from the informative Web page.

For a further embodiment, the source script of a personal Web page of a user could include the section "home address". This "home address" section could allow adding many location coordinates and associated correct times. The user could then show his/her home addresses over time automatically on a map belonging to his/her own Web page. Alternatively, the source script could enable the Web page or application of some other user to show the home addresses of the first user on an own map. Using a time line, it would also be possible seeing where everyone has lived at what point of time. Such a kind of database could also allow, for instance, filtering who lived where at a particular point of time, for example 100 years ago.

For a further embodiment, pieces of information marked by tags could represent a larger area. Such an area could denote for instance areas where to drive carefully because of moose or other animals, or areas for which some other kind of warnings exist, for instance because of some catastrophe. Such areas could then be shown for instance on the map of a car navigator. Moose information could come for example from an informative page about Moose in general. Such a page could be used for adding tags marking information on all the areas where moose are common in general or where moose have been seen lately to the source script. Similarly, information on some environmental accidents such as a nuclear leak could be added for instance to the source script for a nuclear plant information page. Added location information marked by tags could be used for indicating correct locations and times to a car navigator or to generic maps or some other kind of applications/Web pages.

An area in a source script could be defined for example by two locations spanning a rectangle, e.g. from a lower left to an upper right corner. Alternatively, three or more locations could be used for defining an area more flexibly, e.g. with lines connecting the locations providing the limits of the area. One or more particular types of tags could be provided for the information defining areas. The information could be used for showing a warning on a map everywhere in such an area. Such an approach may have the effect that providing such kinds of warnings or other area related notifications is facilitated, because there may be one common Web page or application where the original information is located (for example a Wikipedia page for Moose in general) so that many people can update the page or application. Basically anyone who has some information could easily change or add location data to such a page or application. Such information is likely to be always up to date with respect to the relevant locations, and there is no need to rely on searching for the data at many places when an update on locations and/or times is needed. It has to be noted that also a single piece of information on a location could be suited to designate not only a single point, but also a larger area, like a lake or a mountain.

For a further embodiment, the information on multiple locations relating to film events, filming locations, book events locations, etc., can be added to a source script and marked by tags. For example there may be a Web page for a film that has many locations and times when it happened. These could be added to the source script of the page, and then shown on map, for example by some films/entertainment Web page that wants to show locations of films. Also filming locations could be shown.

For a further embodiment, the tags could be location and time tags marking pieces of information which represent the whereabouts of one or more person. The information could be obtained for instance from home pages of friends, if these include updating information about their locations. Then, an application or Web page could show where who has been when based on the tags.

In another embodiment, multiples pieces of information in a source script marked by tags could be used for showing areas of travel on a map, for instance the areas where a person has traveled during the last ten years. In another embodiment, multiples pieces of information in a source script marked by tags could be used for providing a graphical representation related to culture, for instance where certain cultural things were happening at what time, such as some knitting style. There may have been the same culture in many locations at the same or at different times. In another embodiment, multiples pieces of information in a source script marked by tags could be used for providing a graphical representation informing about particular entertainment events, for instance to the gigs of a particular artist. In another embodiment, multiples pieces of information in a source script marked by tags could be used for providing a graphical representation informing about historical locations and times, for example showing events of wars.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory, a random access memory, a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The functions illustrated by processor 101 or 201 in combination with memory 102 or 202, respectively, or the integrated circuit 205 can also be viewed as means for presenting a plurality of information items to a user, each information item corresponding to at least one piece of information that is marked by at least one tag in a single source script; as means for enabling a user to select presented information items; and as means for enabling a use of a plurality of pieces of information from the source script marked by tags, which correspond to information items selected by a user, for presentation in a graphical representation to the user.

The source script in memory 102 and 202, respectively, can also be viewed as comprising such means in the form of functional modules.

The functions illustrated by processor 701 in combination with memory 702 can also be viewed as means for automatically obtaining a plurality of pieces of information marked by a plurality of tags included in a single source script that is available at another apparatus; and means for presenting the plurality of pieces of information in a single graphical representation to a user.

The program code in memory 702 can also be viewed as comprising such means in the form of functional modules.

Figure 4:
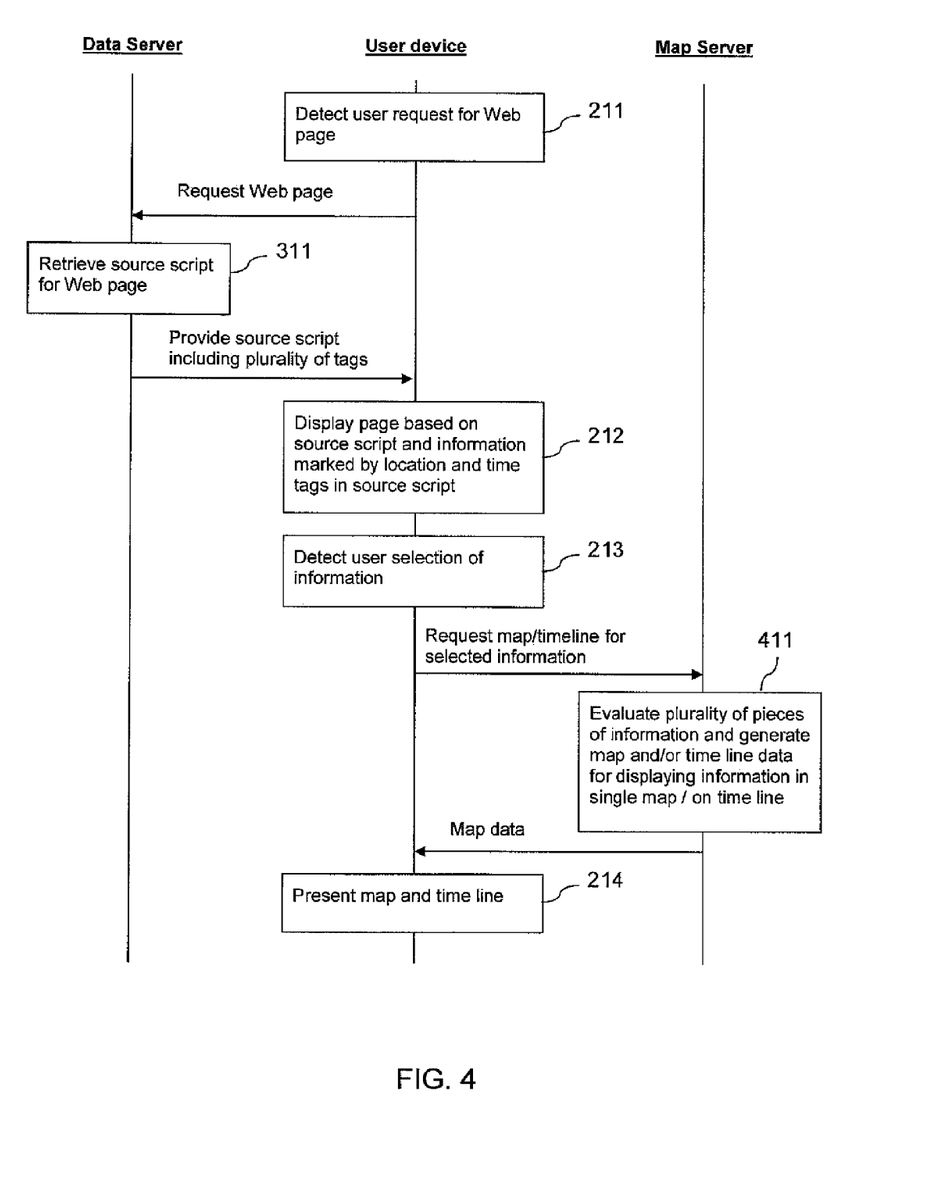
FIG. 4 is a flow chart illustrating an exemplary operation in the system of FIG. 3.
Figure 8:
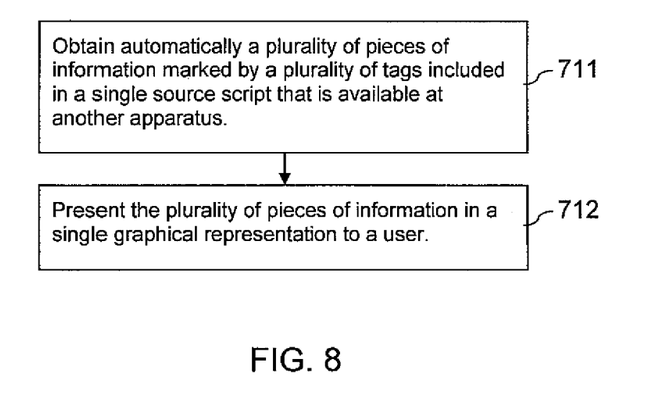
FIG. 8 is a flow chart illustrating a further method.

FIGS. 2, 4 and 8 may also be understood to represent exemplary functional blocks of a source script or of a computer program codes.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an exemplary embodiment in a particular category may also be used in a corresponding manner in an exemplary embodiment of any other category.

What is claimed is:

1. A method comprising:
causing presentation of a plurality of information items to a user, each information item corresponding to at least one piece of information that is marked by at least one tag in a source script for a Web page;
enabling a user to select one or more presented information items from the plurality of information items; and
enabling a use of a plurality of pieces of information from the source script marked by one or more tags, which correspond to information items selected by the user, for presentation in one or more graphical representations to the user, wherein the one or more graphical representations is associated with a source script for an additional Web page.

2. The method according to claim 1, wherein enabling the user to select the one or more presented information items comprises enabling the user to select any number of the one or more presented information items from the plurality of information items.

3. The method according to claim 1, wherein the plurality of pieces of information represent at least one of
a plurality of locations;
a plurality of times; and
an area.

4. The method according to claim 1, wherein the one or more graphical representations comprises at least one of
a map; and
a time line.

5. The method according to claim 1, further comprising enabling the user to perform at least one of a location based search and time based search by interacting with the one or more graphical representations.

6. An apparatus comprising at least one processor and at least one memory including computer program code, the at least one memory and the computer program code configured to, with the at least one processor, cause the apparatus to at least:
cause to present a plurality of information items to a user, each information item corresponding to at least one piece of information that is marked by at least one tag in a source script for a Web page;
enable a user to select one or more presented information items from the plurality of information items; and
enable a use of a plurality of pieces of information from the source script marked by one or more tags, which correspond to information items selected by the user, for presentation in one or more graphical representations to the user, wherein the one or more graphical representations is associated with a source script for an additional Web page.

7. The apparatus according to claim 6, further comprising computer program code configured to, with the at least one processor, cause the apparatus to at least enable the user to select any number of the one or more presented information items from the plurality of information items.

8. The apparatus according to claim 6, wherein the plurality of pieces of information represent at least one of
   a plurality of locations;
   a plurality of times; and
   an area.

9. The apparatus according to of claim 6, wherein the one or more graphical representations comprises at least one of
   a map; and
   a time line.

10. The apparatus according to claim 6, further comprising computer program code further configured to, with the at least one processor, cause the apparatus to enable a user to perform at least one of a location based search and time based search by interacting with the one or more graphical representations.

11. The apparatus according to claim 6, wherein the apparatus is one of:
   a user device;
   a component for a user device;
   a mobile terminal; and
   a component for a mobile terminal.

12. A computer program product comprising at least one non-transitory computer readable storage medium having computer program code stored therein, the computer program code comprising program code instructions configured to:
   cause to present a plurality of information items to a user, each information item corresponding to at least one piece of information that is marked by at least one tag in a source script for a Web page;
   enable a user to select one or more presented information items from the plurality of information items; and
   enable a use of a plurality of pieces of information from the source script marked by one or more tags, which correspond to information items selected by the user, for presentation in one or more graphical representations to the user, wherein the one or more graphical representations is associated with a source script for an additional Web page.

13. A method comprising:
   automatically obtaining a plurality of pieces of information marked by a plurality of tags included in a source script for a Web page that is available at another apparatus; and
   presenting the plurality of pieces of information in one or more graphical representations to a user, wherein the one or more graphical representations is associated with a source script for an additional Web page.

14. An apparatus comprising at least one processor and at least one memory including computer program code, the at least one memory and the computer program code configured to, with the at least one processor, cause the apparatus to at least:
   automatically obtain a plurality of pieces of information marked by a plurality of tags included in a source script for a Web page that is available at another apparatus; and
   present the plurality of pieces of information in one or more graphical representations to a user, wherein the one or more graphical representations is associated with a source script for an additional Web page.

15. A computer program product comprising at least one non-transitory computer-readable storage medium having computer program code stored therein, the computer program code comprising program code instructions configured to:
   automatically obtain a plurality of pieces of information marked by a plurality of tags included in a source script for a Web page that is available at another apparatus; and
   present the plurality of pieces of information in one or more graphical representations to a user, wherein the one or more graphical representations is associated with a source script for an additional Web page.

16. The method according to claim 1, wherein the one or more tags include location and time tags in the source script.

17. The apparatus according to claim 6, wherein the one or more tags include location and time tags in the source script.

18. The computer program product according to claim 12, wherein the one or more tags include location and time tags in the source script.

* * * * *

UNITED STATES PATENT AND TRADEMARK OFFICE
CERTIFICATE OF CORRECTION

PATENT NO. : 9,639,253 B2
APPLICATION NO. : 14/362682
DATED : May 2, 2017
INVENTOR(S) : Erika Reponen It is certified that error appears in the above-identified patent and that said Letters Patent is hereby corrected as shown below:

On the Title Page

Column 2,
Item (57), Under "Abstract", Line 2, "least on" should read --least one--.

In the Claims

Column 13,
Line 7, "to of" should read --to--.

Signed and Sealed this
Twenty-second Day of May, 2018

Andrei Iancu
*Director of the United States Patent and Trademark Office*